Oct. 27, 1931.  V. F. WITTER ET AL  1,829,323
MICROMETER
Filed May 12, 1928
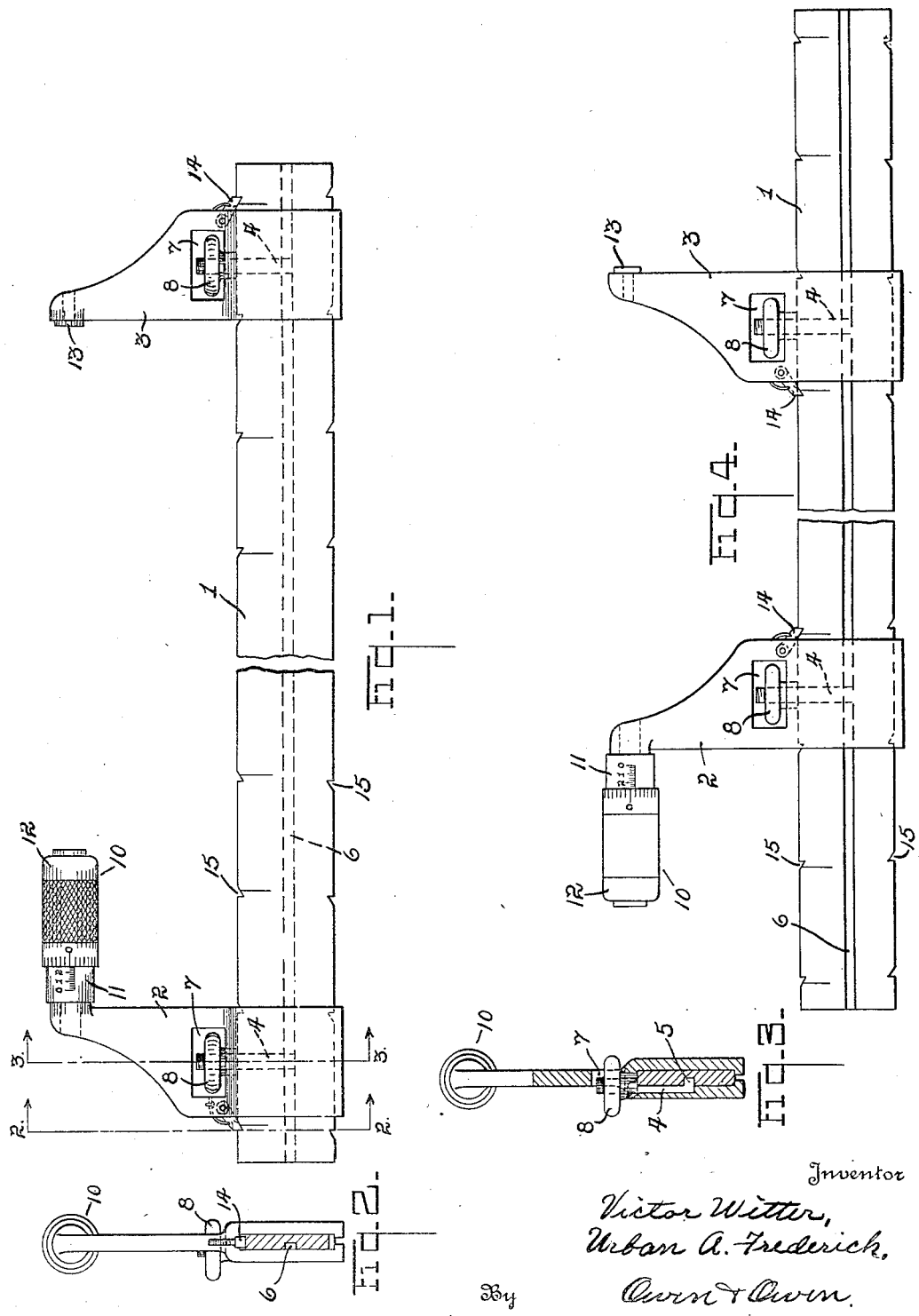

Patented Oct. 27, 1931

1,829,323

UNITED STATES PATENT OFFICE

VICTOR F. WITTER, OF AKRON, AND URBAN A. FREDERICK, OF FREMONT, OHIO

MICROMETER

Application filed May 12, 1928. Serial No. 277,153.

This invention relates to dimension measuring instruments, and particularly to those of the micrometer type.

The primary object of the invention is the provision of an instrument of the character described, which is simple and inexpensive in its construction and is capable of a wide range of adjustment and also of being used to accurately measure both the inside and outside dimensions of articles.

The invention is fully described in the following specification, and while in its broader aspect it is capable of embodiment in numerous forms a preferred embodiment thereof is illustrated in the accompanying drawings, in which,—

Figure 1 is a side elevation of an instrument embodying the invention with the parts arranged for taking outside measurements and with the beam partly broken away. Figs. 2 and 3 are cross-sections on the lines 2, 2 and 3, 3, respectively, in Fig. 1, and Fig. 4 is a view similar to Fig. 1 with the parts arranged for taking inside measurements.

Referring to the drawings, 1 designates a beam of any desired length, which is preferably of ruler form and is customarily graduated to designate any desired units of measurement, such, for instance, as inches.

The beam 1 is provided with two laterally projecting arms 2 and 3 spaced longitudinally of the beam and mounted for longitudinal adjustment thereon.

Each arm 2, 3 is adapted to be firmly secured in adjusted relation to the beam by a locking stem 4 which is mounted in the respective arm transversely of the beam and has one end provided with a foot lug 5 for engaging in a groove 6 provided in one side of the beam lengthwise thereof. The other end of such stem projects into an opening 7 in the associated arm and has a nut 8 threaded thereon within such opening and shouldering against the top of the beam, whereby a tightening of the nut causes it to cooperate with the stem to clamp the arm in adjusted relation to the beam.

The arm 2, in the present instance, is provided on one side thereof in outwardly spaced relation to the beam 1 with a micrometer adjusting head 10, which projects transversely from the arm lengthwise of the beam and toward the other arm when the parts are arranged for taking outside measurements, as shown in Fig. 1. This micrometer head may be of any form and construction suitable for the purpose, and many types of such head are commonly sold on the market. This head comprises, in the present instance, a part 11, which is stationary with respect to the arm 2, and a work engaging part 12, which is adjustably mounted on the part 11. Such adjustment is customarily of a rotary screw type. The other head 3 of the pair is provided in opposition to the micrometer head 10 with a work abutting part 13, which may be mounted in the arm 3 to permit adjustment to compensate for wear, such, for instance, as providing the abutment 13 with a stem which is threaded into the arm.

It is apparent that in the use of the instrument for taking outside measurements of an article, one or both of the arms 2 and 3 may be adjusted on the beam 1 to render the distance between the micrometer head 10 and abutment 13 substantially that of the size of the part to be measured, after which the micrometer head is adjusted to cooperate with the measurement designations on the beam to correctly determine and indicate the desired outside dimension of the article.

For taking inside measurements of an article, such, for instance, as a cylinder, the arms 2 and 3 are placed on the beam in reverse order to that shown in Fig. 1, so that the micrometer head 10 and work abutment 13 are disposed away from each other and at the outer sides of the respective arms, as shown in Fig. 4. The arms having been arranged in this manner on the beam, the correct measurement of the inside diameter of an article is obtained in the same general manner as above stated for obtaining outside dimensions.

To facilitate a step adjustment of the arms 2 and 3 on the beam and to rigidly brace the arms against movement in opposed direction on the beam from that in which the measurement is being taken, each arm is provided with a spring-pressed pawl 14, which may be engaged with any one of a plurality of suitably spaced notches 15 on the edge of the beam adjacent to the pawls. These notches are disposed on both edges of the beam, those on one edge being disposed to prevent outward movements of the dogs and associated arms when engaged therewith, as shown in the arrangement of Fig. 1, and the notches on the other edge of the beam being disposed to prevent inward movements of the pawls and associated arms when the pawls are in engagement therewith, as shown by the arrangement in Fig. 4. It is preferable to have the notches of each set equidistantly spaced a predetermined unit of measurement apart. If such unit of measurement is one inch, the micrometer head 10 should have a permissible adjustment within a range of one inch.

We wish it understood that our invention is not limited to any specific construction, arrangement or form of the parts, as it is capable of embodiment in numerous forms without departing from the spirit of the claim.

Having thus described our invention, what we claim as new and desire to secure by Letters Patent is:

In an instrument of the class described, a beam having a series of notches along one edge and having a longitudinal groove in one face thereof, a pair of arms projecting laterally from the beam, at least one of said arms being adjustable lengthwise of the beam, a pawl carried by said adjustable arm and selectively engageable with said notches to determine the position of adjustment of said arm relative to said beam, a threaded locking stem carried by said adjustable arm and disposed longitudinally thereof, said adjustable arm being provided in its face adjacent the beam with a groove in which the locking stem fits, a lug on said stem extending into the groove in the beam, a nut threaded on the stem and having a shoulder opposed to said lug, said nut being adjustable to bring the shoulder into engagement with a surface of the beam, said lug and said shoulder cooperating to clamp the arm to the beam, and a micrometer head carried by one of said arms and cooperating with the other arm for obtaining precise measurements.

In testimony whereof we have hereunto signed our names to this specification.

VICTOR F. WITTER.
URBAN A. FREDERICK.